March 5, 1935. B. BURNS 1,992,990
SPOT WELDING ELECTRODE
Filed June 12, 1933

INVENTOR.
BRUCE BURNS.
BY
Donald K. Lippincott
ATTORNEY.

Patented Mar. 5, 1935

1,992,990

UNITED STATES PATENT OFFICE 1,992,990

SPOT-WELDING ELECTRODE

Bruce Burns, Santa Monica, Calif., assignor to The Northrop Corporation, Inglewood, Calif., a corporation of California Application June 12, 1933, Serial No. 675,395

16 Claims. (Cl. 219—4)

My invention relates to spot-welding electrodes, and particularly to electrodes for spot-welding material of high thermal and electrical conductivity and small cross section, such as the sheets of aluminum and its alloys which are used in aircraft construction.

Owing to the high conductivity of materials of this class, it is necessary to use extremely high current densities in order to generate the necessary heat, the current density used being of the order of several million amperes per square inch. Because of the small cross section of the materials, and of the very slight difference between the plastic or welding temperature of the material and the point at which it actually melts, it is necessary that the welding currents be applied for extremely short intervals of time, and also that the time be very accurately regulated. Furthermore, because of the relatively slight difference in conductivity between the welding electrodes and the material welded, it is very desirable to make the electrodes as massive and as of large cross section as possible, leaving only a very small length of the electrode of the same diameter as the weld, and to define the size of the weld by one only of the welding electrodes, making the other electrode of materially larger diameter.

These desiderata have led to the development of the so-called "depression" type of electrode. As stated above, one electrode, which may be called the "back electrode" is flat, and of materially larger diameter than the weld. The opposing or "front electrode" has a body of approximately the same diameter as that of the "back electrode" with a flat face, from which projects an extremely short tip, which may be half or less than half the diameter of the body, and whose diameter determines the diameter of the weld. The face of this tip is parallel to the plane of the face of the rest of the electrode, and the projection is usually of the order of one one-hundredth of an inch long.

The structure thus described has two purposes. First, the proportion of the electrode which is operated at high current density is very small, being limited to the projection alone. Second, when a pair of flat plates to be welded are compressed between the front and back electrodes, and the current is continued for longer than the proper welding time, the softening of the material welded permits the projecting tip to sink into the material, thereby contacting an area equal to the entire diameter of the electrode body. As the same current continues to flow, this reduces the current density to an amount insufficient to cause the softening of the material, the melting process is arrested, and a satisfactory weld is made even though the timing may be inaccurate.

Where the sheets are other than perfectly flat, however, or when the faces of the opposed electrodes are not parallel, this arrangement defeats its own end, since the "depression electrode" then contacts the tilted sheet only on the edge of the tip and the edge of the shoulder, the current density at these points rises beyond that required for satisfactory welding, and the result is apt to be that two holes are burnt in the work or two improperly welded spots are produced instead of one satisfactory weld being obtained. It is extremely difficult to keep large sheets perfectly flat, and it follows that either a large number of imperfect welds are made in the course of ordinary production, due to the imperfect contact, or that the work is unduly slowed. Similar results obtain, of course, if the front and back electrodes are not mounted in the first instance with their faces exactly parallel, or where deflections occur in the supporting structure.

The purpose of this invention is to minimize the difficulties above described. With this end in view, some of the objects of the invention are: To provide an electrode whose contact points are self-alining, so that the electrode will adjust itself to make parallel rather than angular contact with the work; to provide a self-alining contact point which will adjust its position to the work substantially without friction; to provide an electrode wherein the alining moment is of greater magnitude than could be supplied by the lever arm corresponding to the small area of the welding tip itself; and to provide an electrode which will operate satisfactorily with small degrees of mis-alinement, and which yet retains the major features of advantage of the depression type electrode above described.

Other objects of my invention will be apparent or will be specifically pointed out in the description forming a part of this specification, but I do not limit myself to the embodiment of my invention herein described, as various forms may be adopted within the scope of the claims.

Referring to the drawing.

Figure 1:
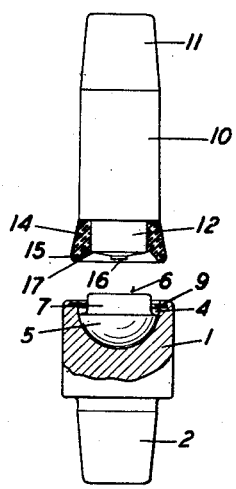
Figure 1 is an elevational view of a pair of electrodes embodying my invention, certain of the parts being shown in section.

Considered broadly, in the electrode of my invention, a ball-and-socket joint is interposed between the contacting face of the electrode and the electrode body. Preferably the contact tip, constituting the male half of the joint, is loosely mounted in the socket, so that it is normally out of contact therewith, being held in this position either by its own weight or otherwise, so that it is free to aline itself to parallel contact with the work, the ball seating in the socket as the electrode advances. There is also preferably provided means, in the form of a compressible collar surrounding the area to be welded, for alining the work and the electrode by the application of pressure through a longer lever arm than is offered by the diameter of the weld itself, and the body or stem of the contact point on the electrode which determines the diameter of the weld is provided with a conical or sloping shoulder so that slight mis-alinements of the welding face with the work do not prevent the formation of a satisfactory weld.

These principles will be better understood by reference to the various embodiments of my invention shown in the drawing. In the embodiment shown in Figure 1 the usual cylindrical electrode body 1 is provided with a taper shank 2 for connection with a conventional form of electrode holder. In the end of the body there is formed a substantially hemispherical or spherically segmental recess 4, which forms the socket of the ball-and-socket joint.

Seating in and conforming with the walls of this recess is the segmental base 5 of a separate contact point. This point is substantially of mushroom shape, the welding face 6 being formed on the end of the short stem 7, the stem being of slightly smaller diameter than the maximum diameter of the segmental base. A snap ring 9, seated in a groove formed adjacent the rim of the recess, permits the stem to pass through while retaining the base in the socket.

The cooperating upper electrode comprises a cylindrical body 10 having a taper shank 11 for contacting the electrode holder. In this instance the contact point 12, whose diameter is of the same order of magnitude as that of the stem 7, is formed integrally with the electrode body, and is surrounded by a collar 14 of rubber or other elastically compressible insulating material. This collar has an angular edge 15, which surrounds and projects beyond the working face of the contact tip 16. The contact tip is of the diameter of the weld to be made, is preferably not greater in diameter than one-half the diameter of the end 12 of the electrode, and projects very slightly, usually about three to ten thousandths of an inch, from the end of the contact point. The shoulder 17 formed by the junction of contact point and tip is conical, the angle of the cone being preferably about 5°. This angle is not critical, however, and in practice may vary from about 1° to about 15°, depending upon the service to which the electrode is to be put.

In use the work is inserted between the electrodes, and the upper electrode is usually the one approached to the work. It makes contact with the work first through the edge 15 of the rubber collar, which forces the work against the face 6 of the lower electrode and forces its alinement with the work before the compression of the collar permits the tip 16 to touch. When suitable pressure has been applied current is passed, forming the weld.

Figure 6:
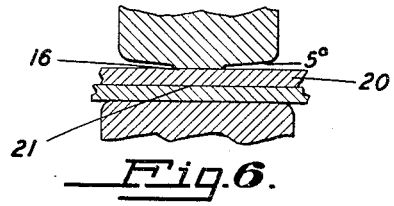
Figures 6, 7 and 8 are sectional views similar to Figure 4, showing the positions and conditions of the properly alined electrodes and work at the beginning of a weld, at the end of the normal welding time, and at the end of an over-timed weld.
Figure 7:
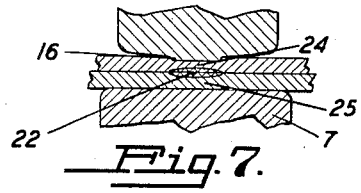
Figure 8:
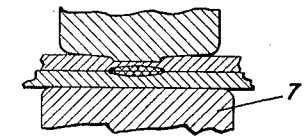

The steps in the formation of the normal weld are shown in Figures 6 to 8 inclusive. When the current is first turned on the tip rests upon the surface of the work 20. It appears probable that when current first flows the contact between the parts of the work occurs only at scattered points within the area 21 between the electrodes. The current density at these points is extremely high, and a pool 22 quickly formed where the material is actually liquid, bounded by areas 24, 25 where the material is merely softened by the passing of the current and by heat conduction from the molten metal. This permits the tip 16 to sink into the surface up to the shoulder as shown in Figure 7. If the weld is properly timed, the current is cut off at the instant when the conditions shown in this latter figure obtain.

If the current continues to flow beyond this point, the electrode sinks deeper into the upper sheet, and as it sinks contacts with a continually increasing area, which reduces the current density and the consequent rate of heating until equilibrium is established and no further softening of the metal occurs, the conditions then being substantially as shown in Figure 8.

Figure 4:
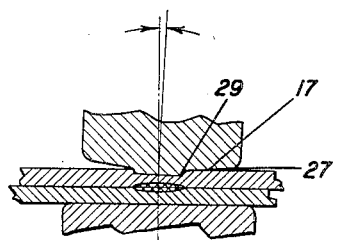
Figure 4 is a sectional view through electrodes and work, showing the effect of slight mis-alinement on the form of electrode herein described.

Even where the self-alining electrodes are used, however, and the electrodes are alined with the general level of the work, irregularities or other causes may result in a slightly angular contact between the electrode and the work as is shown in Figure 4.

Figure 5:
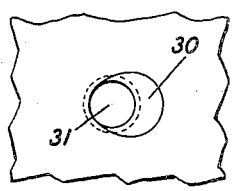
Figure 5 is a plan view of a weld resulting from the conditions illustrated in Figure 4.

Owing to the slope of the conical shoulder 17, however, this does not cause the outer edge 27 to contact immediately with the work, causing burning at the shoulder 27 and the corner 29 of the tip as would be the case with a flat shoulder. Instead of this the positions shown in Figure 4 are assumed, the only difference from the normal weld being that the tip sinks slightly deeper into the work on one side than on the other, and if the weld be slightly overtimed it will be oval in form as is shown in Figure 5, the over-welded rim 30 being asymmetrical with respect to the normal welding area 31.

Figure 2:
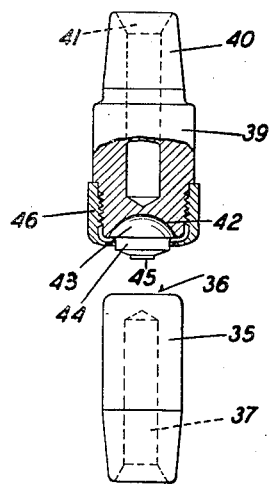
Figure 2 is a similar view of a pair of electrodes embodying the invention in modified form.

In the form of the invention shown in Figure 2, a unitary back electrode 35 is used having the large flat welding face 36. The electrode is shown with a passage 37 for the circulation of cooling water. The upper electrode 39 is provided with the usual taper shank 40 and is also provided with a channel 41 for cooling water. In this instance the upper electrode is the one which is provided with the segmental recess 42, which receives the base 43 of the mushroom shaped contact point. The stem 44 of the contact point is provided with a tip 45 and sloping shoulder similar to that of the rigidly mounted contact point 12 in the embodiment previously described.

A collar ring 46 is threaded onto the body of the electrode, and extends over the flange formed by the junction of the base and stem of the contact point.

Although the contact point is shown firmly seated in a socket, it will be obvious that in practice it will drop down onto the retaining ring 46. As the electrode is advanced to the work the face of the tip 45 will first rest upon the work and assume its proper alinement, and continued advance of the electrode to the work will seat the base in the socket, after which the weld is formed as before. This form of the device is most satisfactory where the members to be welded are naturally flat and the pressure applied between the electrodes need not be relied on to aline the work with the lower electrode.

Figure 3:
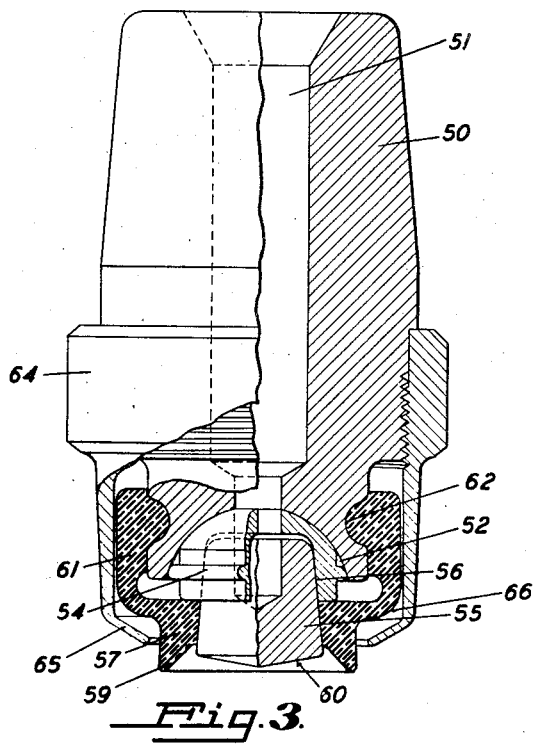
Figure 3 is a view, partly in elevation and partly in section, and on a larger scale, of a water-cooled electrode showing a further modification of the invention.

A modification of the device best suited for extremely heavy duty is illustrated in Figure 3. In this case the electrode body 50 is drilled to form the channel 51 for cooling liquid. This channel continues, at reduced diameter, into the segmental recess 52 formed in the end of the electrode, and on into the segmental base 54 of the contact point. In this instance the stem 55 of the contact point is separable from the base, being held by friction in a tapered socket 56 formed therein.

A compressible rubber collar 57, provided with the angularly disposed edge 59 projecting beyond the face 60 of the contact stem 55, surrounds this stem tightly, fitting against the flange of the base 54 and forming a liquid-tight joint therewith. A skirt or flange 61 on the collar surrounds the end of the electrode body 50, and is held in place by a bead 62 which fits into a corresponding groove in the electrode body. A guard ring 64 is threaded onto the electrode body, and carries an inturned flange 65 which protects the shoulder 66 of the collar.

In this form of the apparatus the contact point is held out of contact with its socket not only by its own weight, but also by the resiliency of the collar and by the pressure of the cooling liquid. Contact of the edge 59 of the collar with the work to be welded alines the contact point, the collar flexing at the shoulder 66, and the base 54 seating in the recess 52 as the electrode advances.

It will be noted that the welding face 60 of the contact point is in this instance shown as being conical and formed without the usual tip. A point of this character, however, quickly assumes the contour shown in Figures 4, 6, 7 and 8, particularly when used on harder materials such as duralumin or other hard alloys. This appears to be due to a swaging effect, which is complicated by the fact that the materials though of approximately the same hardness when cold, are heated to different degrees in the welding process, so that a sharply defined tip and sloping shoulder are formed, as shown in the figures.

Although the electrode pairs shown in Figures 1 and 2 each comprise but one electrode with an adjustable tip, it will be obvious that the electrodes 1 and 39 or 1 and 50 can be used in combination, providing adjustable tips on both electrodes. In some services that is a very desirable arrangement, and it is shown, for example, in my copending application entitled Welding method and apparatus, Serial No. 675,396, filed simultaneously with this application.

I claim:

1. A spot-welding electrode comprising a contact point having a flat face adapted to form a parallel contact with the work and an opposite spherically segmental face, and an electrode body having a recess therein conformed to and engaging said segmental face.

2. A spot-welding electrode comprising a contact point having a flat face adapted to form a parallel contact with the work and an opposite spherically segmental face, an electrode body having a recess therein shaped in conformity with said segmental face, and means for retaining said contact point loosely within said recess.

3. A spot-welding electrode comprising a contact point having a flat face adapted to form a parallel contact with the work and an opposite spherically segmental face, an electrode body having a recess therein shaped in conformity with said segmental face, and means for retaining said contact point positioned within said recess but out of engagement with the walls thereof, whereby approaching said contact to said work will first aline the contact with the work and then engage the segmental face of the contact with the recess walls.

4. A spot-welding electrode comprising a contact point of mushroom-like form, having a spherically segmental base and cylindrical stem and a working face formed on the end of said stem, a body for said electrode recessed to conform to said base, and a retaining ring fixed to said body and surrounding said stem to retain said contact point adjustably positioned in said recess.

5. A spot-welding electrode comprising a contact point of mushroom-like form, having a spherically segmental base and cylindrical stem and a working face formed on the end of said stem, a body for said electrode recessed to conform to said base, a retaining ring fixed to said body and surrounding said stem to retain said contact point adjustably positioned in said recess, and insulating means of larger diameter than said working face surrounding said stem for contacting the work to aline said working face therewith.

6. A spot-welding electrode comprising a contact point of mushroom-like form, having a spherically segmental base and cylindrical stem and a working face formed on the end of said stem, a body for said electrode recessed to conform to said base, and an annular rubber collar affixed to said body and contact point for holding said base adjustably in said recess.

7. A spot-welding electrode comprising a contact point of mushroom-like form, having a spherically segmental base and cylindrical stem and a working face formed on the end of said stem, a body for said electrode recessed to conform to said base, and a flexible collar affixed to said body and said contact point for holding said base adjustably positioned in said recess.

8. A spot-welding electrode comprising a contact point of mushroom-like form, having a spherically segmental base and cylindrical stem and a working face formed on the end of said stem, a body for said electrode recessed to conform to said base, and a flexible collar affixed to said body and said contact point for holding said base adjustably positioned in said recess, said collar having a compressible rim encircling the working face of said contact point for alining said face with the work.

9. In combination, a pair of cooperating spot-welding electrodes, one of said electrodes comprising a contact point connecting with the body of said electrode by a ball-and-socket joint, and the other of said electrodes having a contact point positioned to engage said first mentioned contact point, and a compressible collar surrounding one of said contact points and projecting beyond the face thereof and in alinement therewith, whereby pressure applied between said electrodes and the work to be welded will aline said work in parallel contact with said contact points.

10. In combination, a conducting electrode body, a contact point having a working face relatively small with respect to the total diameter of said contact point, said contact point being adjustably mounted on said body to permit the alinement of said face with the work to be welded, and an annular compressible collar tightly surrounding said contact point and projecting beyond said working face, whereby pressing said collar against the work is effective to aline the contact point before the compression of the collar permits contact of the point with the work.

11. A spot-welding electrode comprising the combination of a contact point having a stem of larger diameter than the weld to be formed, a projecting tip on said stem of the diameter of said weld, the shoulder formed by the junction of said tip and said stem being in the form of a flat cone, and a compressible collar surrounding said stem and projecting beyond the face of said tip for pressing the work to be welded into alinement with said face by the application of the welding pressure.

12. A spot-welding electrode comprising a contact point having a stem of larger diameter than the weld to be formed, and a projecting tip on said stem of the diameter of said weld, the shoulder formed by the junction of said tip and said stem being in the form of a flat cone.

13. A spot-welding electrode comprising a contact point having a stem of larger diameter than the weld to be formed, and a projecting tip on said stem of the diameter of said weld, the shoulder formed by the junction of said tip and said stem being in the form of a cone having an angle between 1° and 15°.

14. In a spot-welding electrode a contact point comprising a tip of the diameter of the projected weld and a length short as compared to the thickness of the material to be welded, and a stem of materially larger diameter than said tip and forming therewith a shoulder of flatly conical form.

15. In a spot-welding electrode a contact point comprising a tip of the diameter of the projected weld and a length short as compared to the thickness of the material to be welded, and a stem of materially larger diameter than said tip and forming therewith a shoulder disposed at an angle of approximately 5° with the working face of said tip.

16. A spot-welding electrode comprising a body having a segmental recess in one end thereof and having a passage for cooling liquid opening into said recess, a contact point having a base shaped to conform to said recess and seated therein, and a flexible collar forming a liquid-tight joint between said contact point and said body retaining said contact point adjustably positioned in said recess.

BRUCE BURNS.